(No Model.)
7 Sheets—Sheet 1.
H. M. MYERS.
PLANT FOR MANUFACTURING SHOVELS.
No. 340,600. Patented Apr. 27, 1886.
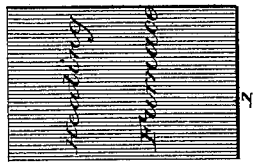
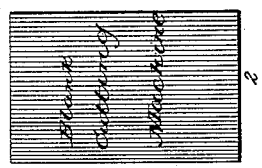
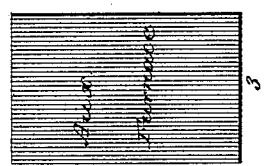
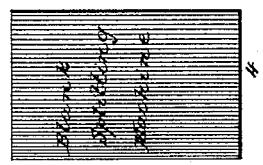
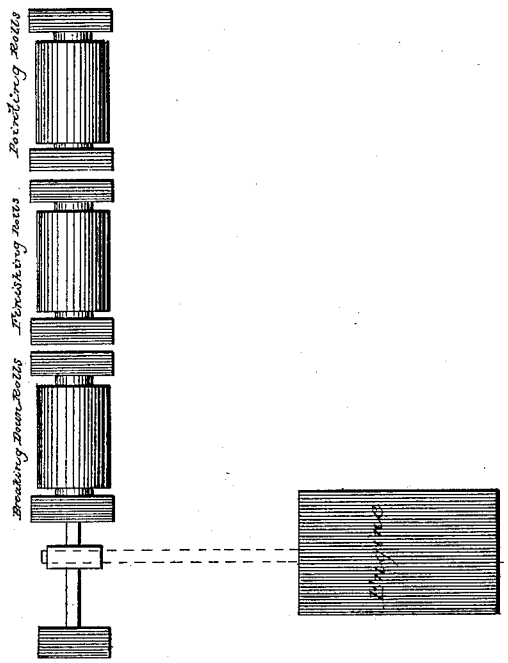
Fig. 1.
WITNESSES
Fred. G. Dieterich
Jos. A. Ryan
INVENTOR
Henry M. Myers (No Model.) 7 Sheets—Sheet 2.
H. M. MYERS.
PLANT FOR MANUFACTURING SHOVELS.

No. 340,600. Patented Apr. 27, 1886.

WITNESSES
Fred. G. Dieterich
Jos. A. Ryan

INVENTOR
Henry M. Myers (No Model.) 7 Sheets—Sheet 3.

H. M. MYERS.
PLANT FOR MANUFACTURING SHOVELS.

No. 340,600. Patented Apr. 27, 1886.

WITNESSES
INVENTOR (No Model.) 7 Sheets—Sheet 4.
H. M. MYERS.
PLANT FOR MANUFACTURING SHOVELS.

No. 340,600. Patented Apr. 27, 1886.

WITNESSES
Fred. G. Dieterich
Jos. A. Ryan.

INVENTOR
Henry M. Myers (No Model.) 7 Sheets—Sheet 5.
H. M. MYERS.
PLANT FOR MANUFACTURING SHOVELS.

No. 340,600. Patented Apr. 27, 1886.

(No Model.) 7 Sheets—Sheet 6.
H. M. MYERS.
PLANT FOR MANUFACTURING SHOVELS.
No. 340,600. Patented Apr. 27, 1886.
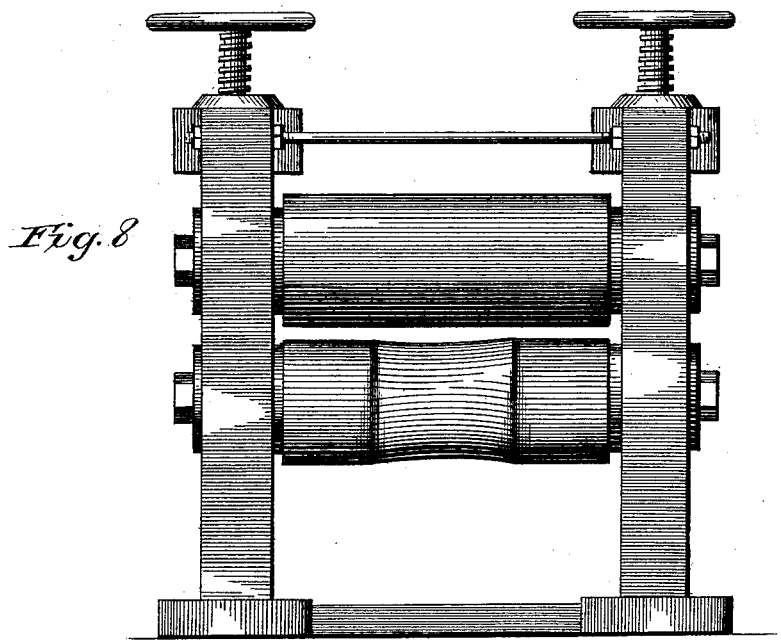
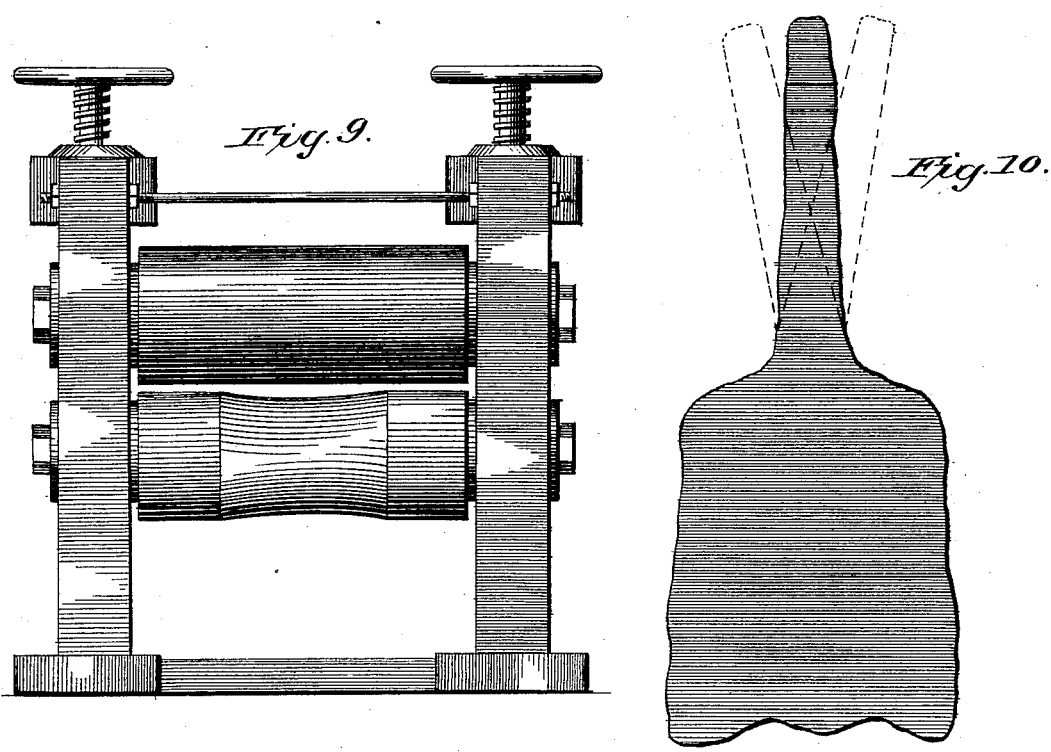
WITNESSES
Fred. G. Dieterich
Jos. A. Ryan
INVENTOR
Henry M. Myers (No Model.) 7 Sheets—Sheet 7.

H. M. MYERS.
PLANT FOR MANUFACTURING SHOVELS.

No. 340,600. Patented Apr. 27, 1886.

WITNESSES
Fred. G. Dieterich
Jos. A. Ryan

INVENTOR
Henry M. Myers

UNITED STATES PATENT OFFICE.

HENRY M. MYERS, OF BEAVER FALLS, PENNSYLVANIA.

PLANT FOR MANUFACTURING SHOVELS.

SPECIFICATION forming part of Letters Patent No. 340,600, dated April 27, 1886.

Application filed April 6, 1885. Serial No. 161,276. (No model.)

*To all whom it may concern:*

Be it known that I, HENRY M. MYERS, a citizen of the United States, residing at Beaver Falls, in the county of Beaver and State of Pennsylvania, have invented certain new and useful Improvements in Plants for the Manufacture of Shovels, Spades, or Scoops; and I do hereby declare the following to be a full, clear, and exact description of the invention, such as will enable others skilled in the art to which it appertains to make and use the same.

In the art of making shovels the great desideratum of the manufacturer is to produce the article with facility and by the employment of as little skilled labor as possible, so that he can furnish the trade with shovels at the minimum of cost.

In the present state of the art the manner of constructing shovels is such that a large amount of the labor employed is skilled labor, and the process of forming the shovel-blade and its handle-straps consumes much time, and their production is costly.

The object of my improvement is to dispense with most of the skilled labor now employed in the making of shovels, scoops, and spades, and to produce them with facility and at a diminished cost, which is accomplished by the plant hereinafter described.

To enable others skilled in the art with which my invention is most nearly connected to make and use it, I will proceed to describe its construction and operation.

Figure 2:
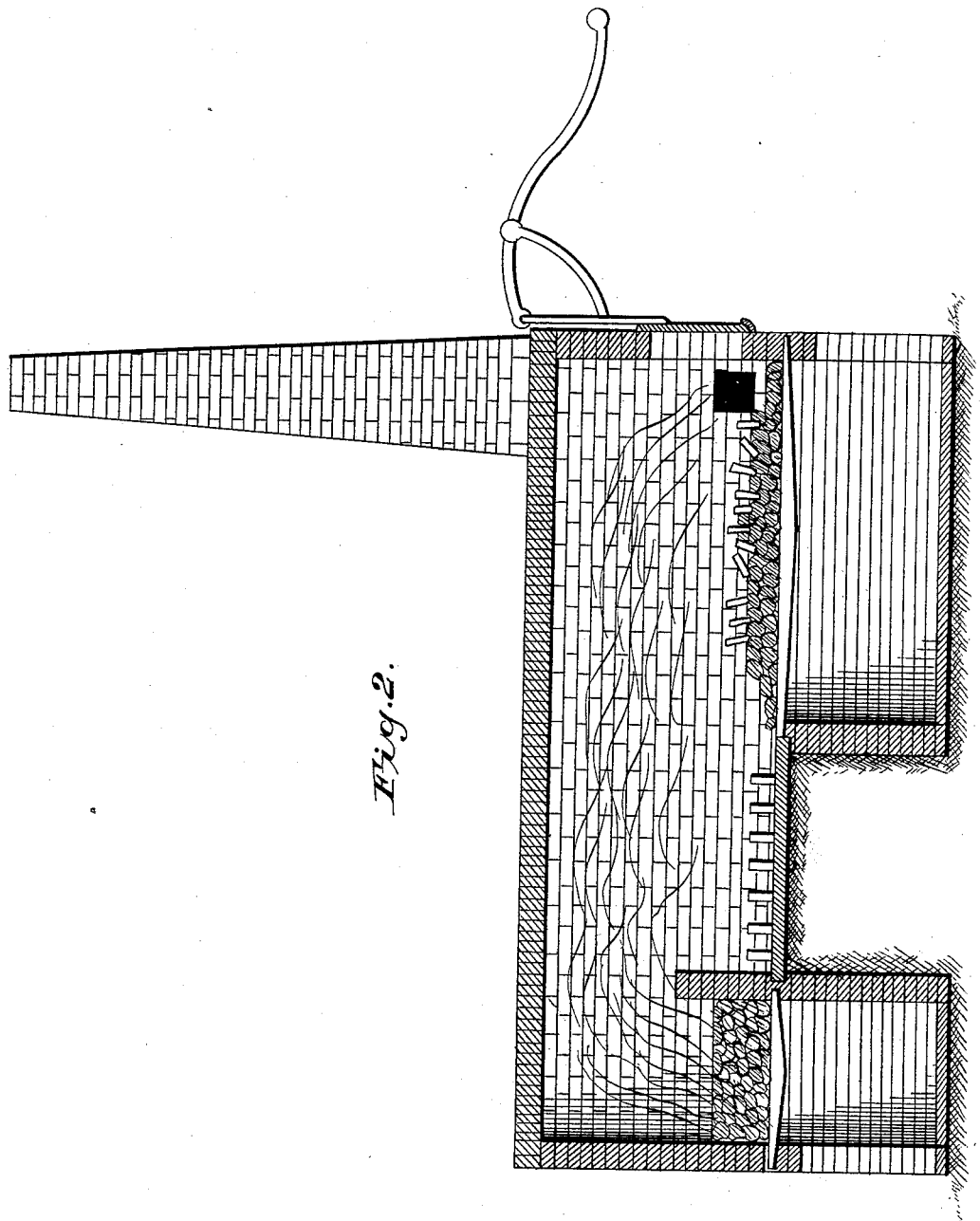
Figure 3:
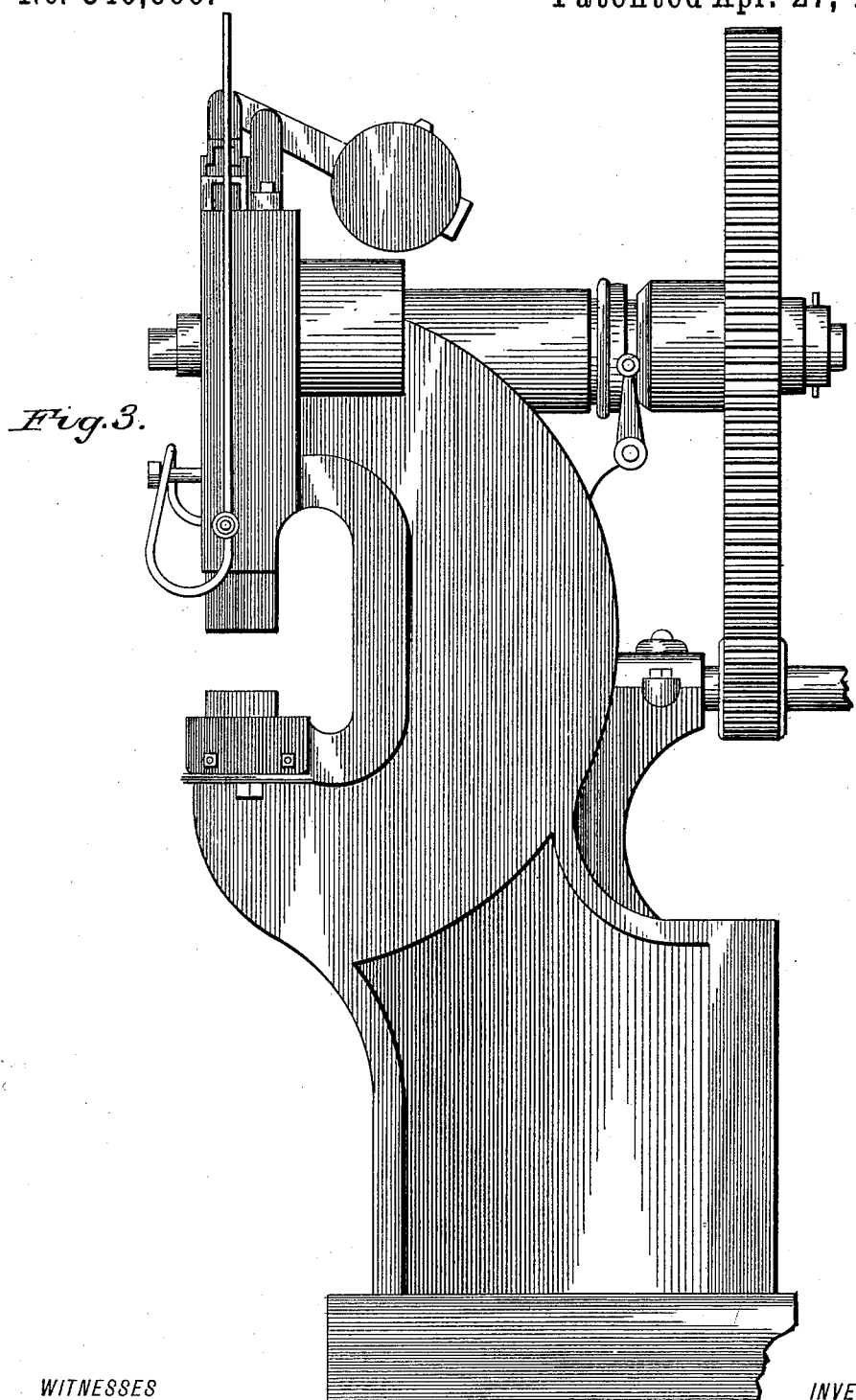
Figure 4:
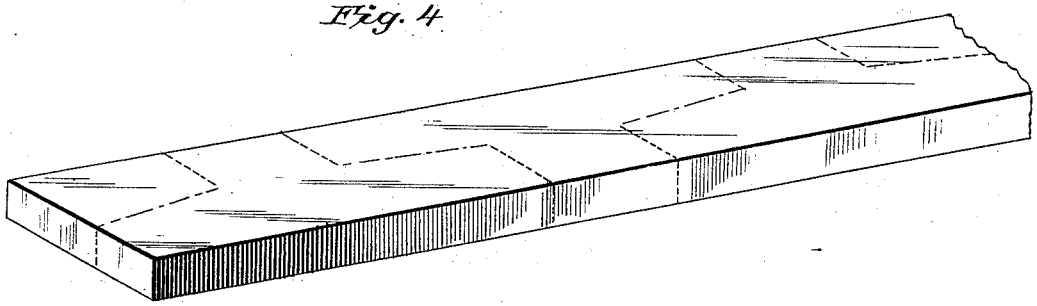
Figure 5:
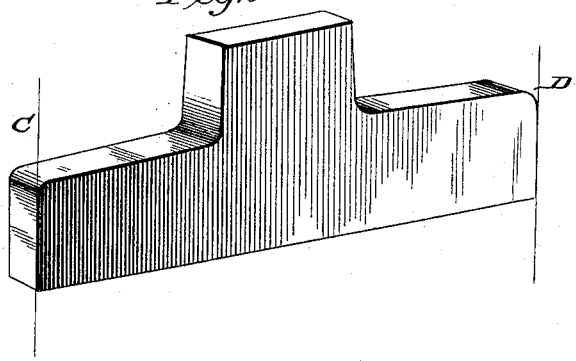
Figure 7:
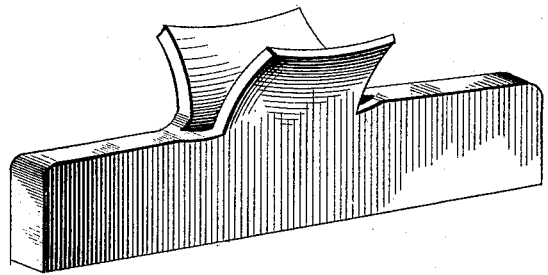
Figure 6:
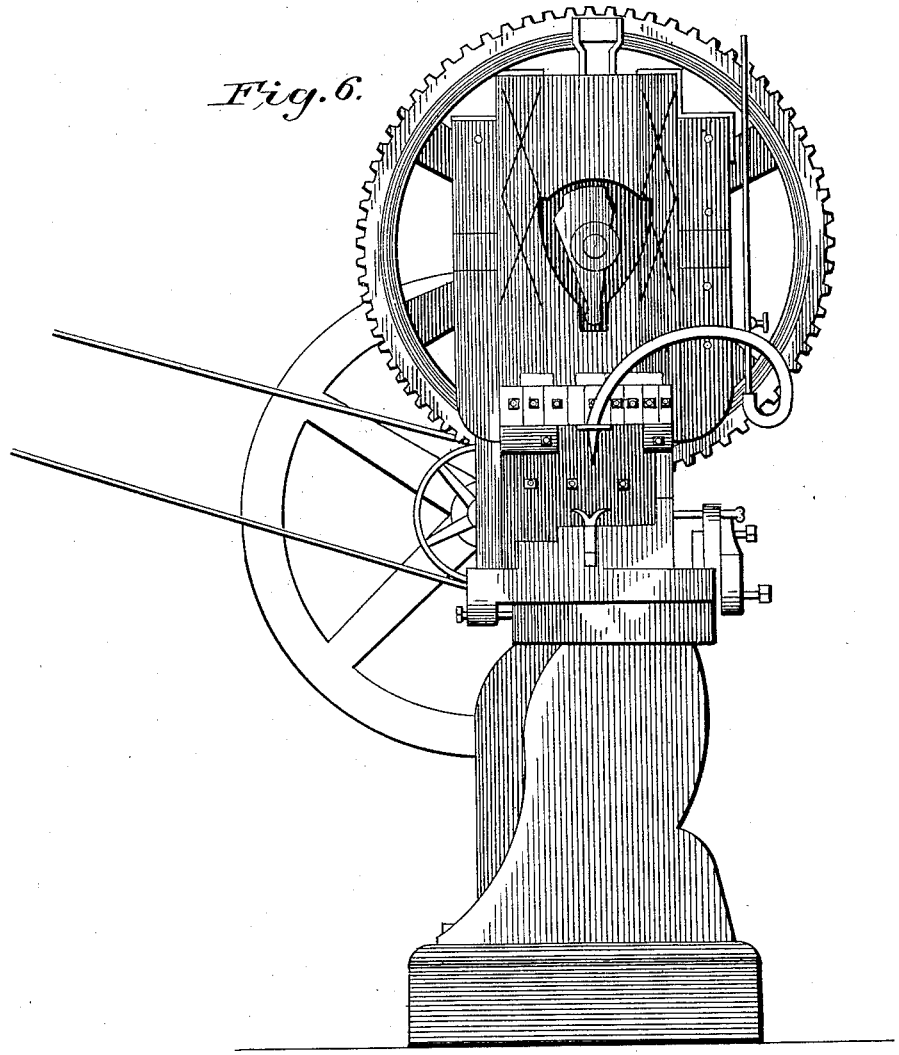
Figure 11:
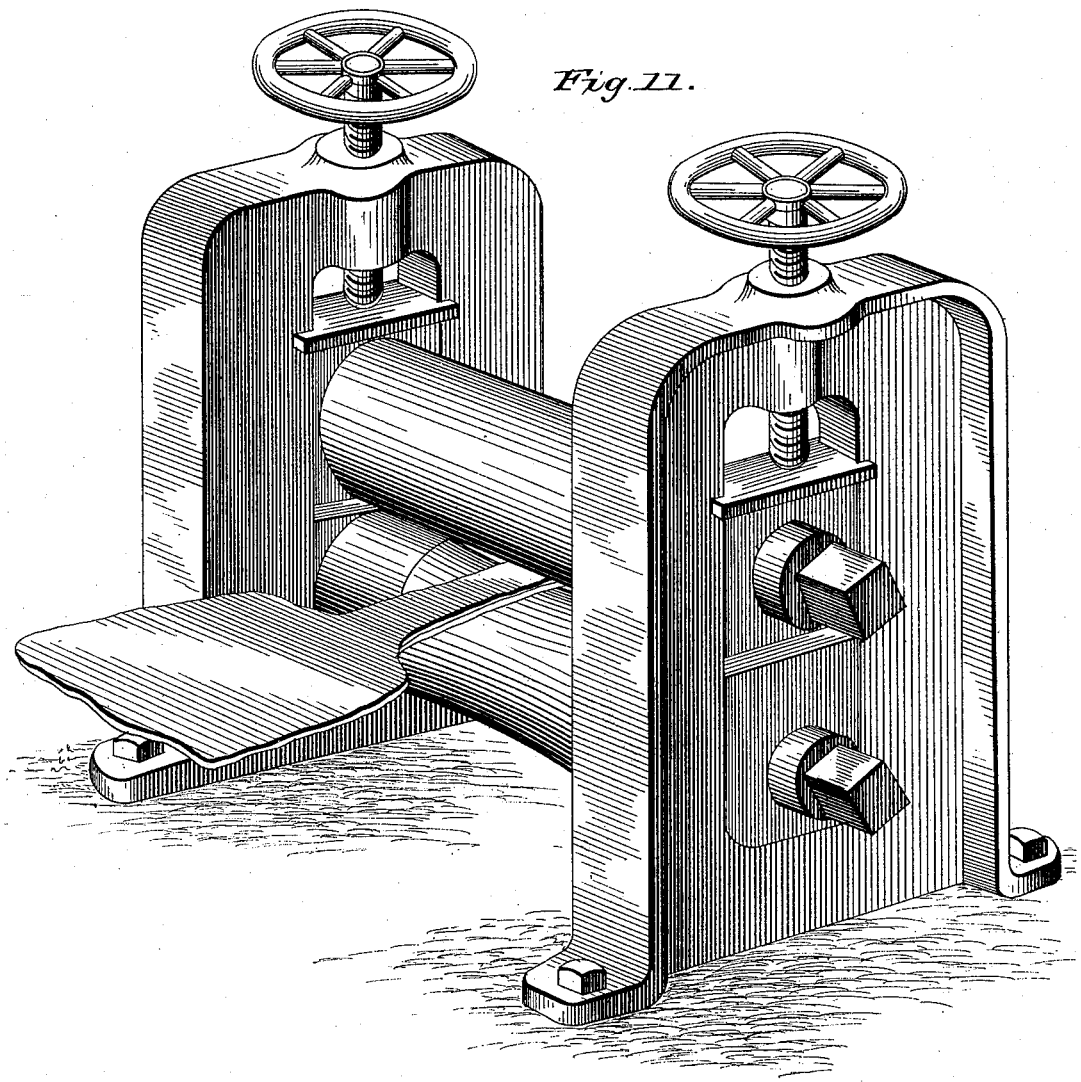

In the accompanying drawings, which form part of this specification, Figure 1 represents a diagram of the plant employed for carrying out the several steps of my invention. Fig. 2 represents a vertical longitudinal section of a furnace employed for heating the bars of metal prior to cutting them into blanks for shovels. Fig. 3 is a side elevation of a machine for cutting the blanks for shovels. Fig. 4 is a perspective view of a bar of a predetermined thickness and width from which the blanks for shovels are cut with the minimum waste of stock. Fig. 5 is a perspective view of a blank for making the shovel cut from said bar in the manner indicated by the dotted lines in Fig. 4. Fig. 6 is a front elevation of a machine employed to split the tang of the blank and form the socket in the blank for receiving the end of the wooden handle. Fig. 7 is a perspective view of the blank after its tang has been split and the socket formed therein. Fig. 8 is a front elevation of a pair of reducing-rolls for "breaking down" and partially rolling the blank shown in Fig. 7. Fig. 9 is a front elevation of a pair of finishing-rolls for the further reduction of the blank. Fig. 10 is a top view or plan of the blank when rolled out and ready for the shearing process. Fig. 11 is a perspective view of a pair of rolls, representing the manner of introducing the blank between the rolls hereinbefore mentioned.

The several instrumentalities hereinbefore mentioned and shown may be of any known construction and operation, and are not claimed as being of my invention separately considered.

The furnace for heating the bars of metal (shown in Fig. 4) is located as represented in the diagram, Fig. 1, and marked 1, with relation to the blank-cutting machine (marked 2, in the diagram and shown in Fig. 3,) and is cut into a series of blanks, which are removed to the splitting-machine, (marked 4 in the diagram and shown in Fig. 6.) which machine splits the tang A of the blank B (shown in Fig. 5) and forms the socket therein for the lower end of the wooden handle of the shovel, as indicated in Fig. 7. A little cinder is then placed in the socket and between the two parts of the split tangs to prevent their welding together while undergoing the rolling process. The blank is then removed to the breaking-down rolls, (marked 5 in the diagram, and represented in Fig. 8,) between which the blank is passed several times and reduced in thickness and increased in length. From this pair of rolls the partially-reduced blank is removed to the "finishing-rolls" (marked 6 in the diagram, and represented in Fig. 9,) and passed between them until the blank is reduced to its desired thickness and length, and if it is desired to point the blank it is removed to a pair of eccentric rolls (marked 7 in the diagram, Fig. 1) and pointed, which operation is well understood in analogous arts.

The blank shown in Fig. 7 is always entered between the rolls with the tang entering first, as shown in Fig. 11, and rolled lengthwise of the blank or blade of the shovel and its handle-straps in contradistinction to the usual plan of rolling the blank transversely, or at an oblique angle to the longitudinal axis of the blade and its handle-straps.

It has been found by experience that if the tang is not entered first between the rolls in the rolling of the blank they will spread laterally, as indicated by the dotted lines in Fig. 10.

The blank, after having been properly reduced, as hereinbefore described, is subjected to the shearing or trimming process well known in the art to which my invention relates, and is afterward given its desired form by suitable dies provided with its wooden handle and finished in any of the usual or preferred ways.

The rolls represented in Figs. 8 and 9 are of the construction required when it is desired to have the shovel-blade and handle-straps with increased thickness in the center throughout the length of the blade and straps and diminishing in thickness toward the side edges thereof, in which case the curved recess in the roll or rolls of Fig. 8 (designated as the "break-down" roll in the diagram) is greater than the curved recess of the roll or rolls of Fig. 9. (Designated as "finishing-rolls" in said diagram.)

Experience has demonstrated that this difference between the two mills or sets of rolls is a necessity in the reducing process hereinbefore described, which will be apparent to those skilled in the art of rolling metals; but when it is desired to have the shovel-blades of uniform thickness plain rolls will be substituted for the rolls shown in the drawings.

The blank employed in making shovels, and shown in Fig. 5, from the end C to D should be about equal in length to the desired width of the shovel-blade to be made therefrom.

It has been demonstrated by practice in my works at Beaver Falls, Pennsylvania, that by my method of manufacturing shovels and spades by means of the plant hereinbefore described, in making one hundred dozen of shovels or spades five men and one boy accomplish it with more ease and do better work than was formerly done in the said works by twenty-five men. In addition, there is also this advantage—viz., seventeen furnaces, fourteen tilt and steam hammers are dispensed with, and a saving of one hundred and forty bushels of coal is secured in the making of the said number of shovels or spades, which shovels or spades under the said new method and said plant are finished with more ease, are better in quality, and the waste of stock is diminished at least three pounds per dozen, defects in the shovels and spades decreased nine-tenths, ($\frac{9}{10}$,) which, taken in connection with the economy of room, of fire-brick, and fire-clay, clearly indicates that the said method and plant is a step forward in the art of making shovels and spades of no small proportion, and which saves in the manufacture of shovels and spades one dollar and two cents per dozen, which fact has been ascertained by careful observation of the working of said plant and the expenses connected therewith, as compared with the best method and means known to the art.

It will be observed by reference to the diagram shown in Fig. 1 than an auxiliary furnace (marked 3) is indicated, the function of which is to retain the heat in the blanks should any break in the continuity of the operation occur.

The blanks shown in Figs. 5 and 10 and the process involved in their production are claimed in other applications for Letters Patent marked Case B, C, and E, respectively, Serial Nos. 155,521, 155,522, and 155,654.

In application No. 161,277 I have claimed a plant in which the blank-cutting machine herein shown is omitted.

Having thus described my invention, what I claim is—

For the manufacture of shovels, spades, or scoops to the shearing-point, a plant comprising a furnace, a blank-cutting machine, an auxiliary furnace, a machine for splitting the tang of the blank to form the handle-straps and the socket, a pair of breaking-down rolls, a pair of finishing-rolls, and a pair of pointing-rolls, all arranged and operating with relation to each other substantially as herein described.

In testimony whereof I affix my signature in presence of two witnesses.

HENRY M. MYERS.

Witnesses:
JAMES J. JOHNSTON,
WM. R. DAVIS.